(12) United States Patent
Wendt et al.

(10) Patent No.: US 12,717,385 B2
(45) Date of Patent: Aug. 25, 2026

(54) ROTATING MAGNET ASSEMBLY IN A FOLDABLE DEVICE

(71) Applicant: Microsoft Technology Licensing, LLC, Redmond, WA (US)

(72) Inventors: Nicholas Benjamin Wendt, Granger, IN (US); Karsten Aagaard, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 18/846,391

(22) PCT Filed: Feb. 16, 2023

(86) PCT No.: PCT/US2023/062711
§ 371 (c)(1),
(2) Date: Sep. 12, 2024

(87) PCT Pub. No.: WO2023/192720
PCT Pub. Date: Oct. 5, 2023

(65) Prior Publication Data

US 2025/0190028 A1 Jun. 12, 2025

(30) Foreign Application Priority Data

Mar. 28, 2022 (NL) ..................................... 2031418

(51) Int. Cl.
*G06F 1/16* (2006.01)

(52) U.S. Cl.
CPC .......... *G06F 1/1679* (2013.01); *G06F 1/1618* (2013.01); *G06F 1/1681* (2013.01)

(58) Field of Classification Search
CPC .... G06F 1/1679; G06F 1/1618; G06F 1/1681; G06F 1/1647; G06F 1/1616; H01F 7/0252; H01F 7/04
See application file for complete search history.

(56) References Cited

U.S. PATENT DOCUMENTS 5,706,332 A * 1/1998 Nagai ................. H04M 1/0214 379/433.06
5,910,883 A * 6/1999 Cipolla ............... F28D 15/0233 361/679.52

(Continued)

FOREIGN PATENT DOCUMENTS

CN 201837920 U 5/2011
CN 105302249 A 2/2016

(Continued)

OTHER PUBLICATIONS

Notice of Allowance mailed on Dec. 23, 2025, in U.S. Appl. No. 18/172,721, 21 Pages.

(Continued)

*Primary Examiner* — Lisa Lea-Edmonds
(74) *Attorney, Agent, or Firm* — Alleman Hall LLP

(57) ABSTRACT

A foldable computing device comprises a first frame comprising a first magnet assembly and a second frame rotatably coupled to the first frame via a hinge. The second frame comprises a second magnet assembly operatively configured for rotation with respect to the second frame. The second magnet assembly attracts the first magnet assembly of the first frame when the first frame and the second frame are in a closed configuration. The second frame further comprises an actuator operatively configured to rotate the second magnet assembly to thereby reduce a magnetic force between the first magnet assembly and the second magnet assembly and allow the foldable computing device to open.

20 Claims, 8 Drawing Sheets

(56) References Cited

U.S. PATENT DOCUMENTS 5,932,855 A * 8/1999 Wang .................. G06F 15/0216 200/50.04
6,006,243 A 12/1999 Karidis
6,108,196 A * 8/2000 Jung ..................... G06F 1/1679 292/108
6,366,440 B1 * 4/2002 Kung ...................... E05C 19/16 361/679.55
6,965,512 B2 * 11/2005 Huang .................. G06F 1/1679 361/679.55
7,583,500 B2 * 9/2009 Ligtenberg ............ G06F 1/1616 361/147
8,089,748 B2 * 1/2012 Chiang ................. G06F 1/1679 455/575.8
9,395,762 B2 7/2016 Sharma et al.
9,483,081 B2 11/2016 Lee et al.
9,552,037 B2 1/2017 Ooi
9,840,861 B1 * 12/2017 Määttä ...................... E05D 1/00
9,930,152 B2 * 3/2018 Kim .................... H04M 1/0216
10,068,692 B2 * 9/2018 Määttä .................. G06F 1/1679
10,114,418 B2 10/2018 Shin
10,257,950 B2 * 4/2019 Määttä .................... H01F 7/021
10,261,573 B2 4/2019 Sunwoo
10,481,641 B2 11/2019 Lee et al.
10,672,548 B2 * 6/2020 Srinivasan .............. E05C 19/16
10,754,393 B2 * 8/2020 Campbell ............. G06F 1/1681
10,795,416 B2 10/2020 Schmelzle et al.
10,866,619 B1 12/2020 Bushnell
11,062,831 B2 * 7/2021 Määttä ...................... G06F 1/16
11,175,720 B2 11/2021 Lai
11,243,563 B2 * 2/2022 Singla ................... G06F 1/1616
11,256,290 B2 * 2/2022 Yang ....................... G06F 1/181
11,422,592 B2 * 8/2022 Holung ..................... E05D 3/02
11,564,322 B2 * 1/2023 Määttä .................... H01F 7/021
11,567,543 B2 * 1/2023 Siddiqui ............... G06F 1/1679
11,616,867 B2 3/2023 Kwon
11,669,132 B2 * 6/2023 Siddiqui ............... G06F 1/1647 361/679.27
11,783,978 B2 * 10/2023 Tazbaz .................. G06F 1/1681 361/807
11,811,961 B2 11/2023 Zhang
12,181,916 B2 * 12/2024 Jensen .................. G06F 1/1616
12,231,591 B2 * 2/2025 Wendt ................... G06F 1/1679
12,235,687 B2 * 2/2025 Siddiqui ............... G06F 1/1618
12,287,681 B2 * 4/2025 Siddiqui ............... G06F 1/1683
12,488,922 B2 * 12/2025 Tazbaz ............... A45C 13/1069
2002/0069483 A1 * 6/2002 Savolainen ........... G06F 1/1683 16/308
2002/0089190 A1 * 7/2002 Wang .................... E05B 63/244 292/195
2003/0011972 A1 1/2003 Koo
2007/0133156 A1 * 6/2007 Ligtenberg ............ G06F 1/1616 361/679.3
2008/0304215 A1 12/2008 Chiu
2015/0227377 A1 8/2015 Park
2017/0145724 A1 * 5/2017 Siddiqui ............... G06F 1/1681
2017/0168631 A1 6/2017 Roberts-hoffman
2018/0054905 A1 * 2/2018 Määttä ................. H05K 5/0221
2019/0069066 A1 2/2019 Song
2019/0074120 A1 * 3/2019 Määttä .................. H01F 7/0263
2019/0164675 A1 * 5/2019 Srinivasan .............. E05C 19/16
2019/0191578 A1 * 6/2019 Määttä ................. H05K 5/0221
2019/0220064 A1 * 7/2019 Park ...................... G06F 1/3206
2019/0394894 A1 12/2019 Kim
2020/0273613 A1 8/2020 Lauder et al.
2021/0125762 A1 * 4/2021 Singla ................... G06F 1/1616
2021/0318721 A1 10/2021 Li
2021/0365079 A1 * 11/2021 Weldon ................. G06F 1/1654
2022/0100238 A1 * 3/2022 Siddiqui ............... G06F 1/1641
2022/0100239 A1 * 3/2022 Siddiqui ............... G06F 1/1618
2022/0147100 A1 * 5/2022 Kashyap ................ H10N 30/50
2022/0264756 A1 8/2022 Oh
2023/0164938 A1 * 5/2023 Määttä ................. H05K 9/0075 335/219
2023/0168720 A1 * 6/2023 Siddiqui ............... G06F 1/1681 361/679.28
2023/0266804 A1 * 8/2023 Siddiqui ............... G06F 1/1683 361/679.27
2023/0421672 A1 * 12/2023 Wendt ................... G06F 1/1679
2024/0126322 A1 * 4/2024 Jensen .................. G06F 1/3287
2024/0281040 A1 * 8/2024 Park ........................ G09F 9/301
2025/0190028 A1 * 6/2025 Wendt ....................... H01F 7/04

FOREIGN PATENT DOCUMENTS

EP 2463744 A1 6/2012
JP 2004213981 A 7/2004
JP 2008199215 A 8/2008
WO 2020011376 A1 1/2020
WO 2021015781 A1 1/2021
WO 2022164081 A1 8/2022

OTHER PUBLICATIONS

International Search Report and Written Opinion received for PCT Application No. PCT/US2023/062711, Apr. 3, 2023, 15 pages.

International Search Report and Written Opinion received for PCT Application No. PCT/US24/015887, Jun. 5, 2024, 14 pages.

Mishra, Umakant, "10 Inventions on Laptop Keyboards—A Study Based on US Patents", In Repository of arXiv:1310.3849v1, Oct. 11, 2013, 12 Pages.

Non-Final Office Action mailed on May 6, 2024, in U.S. Appl. No. 18/046,411, 07 pages.

Notice of Allowance mailed on Aug. 21, 2024, in U.S. Appl. No. 18/046,411, 05 pages.

Search Report Received for Netherlands Application No. N2031418, mailed on Nov. 16, 2022, 11 pages.

Non-Final Office Action mailed on Sep. 17, 2025, in U.S. Appl. No. 18/172,721 20 Pages.

* cited by examiner 104
116
112

118A
108A
118B
Y
X
Z
114A
114B
108B 118A
108
108A
104
108B
114A
Z
114B
X
Y
118B
120
116
112
104
2
118A
2
118
118B

Z
X
Y
114B
118
118B
118A
120
Z
104
X
Y

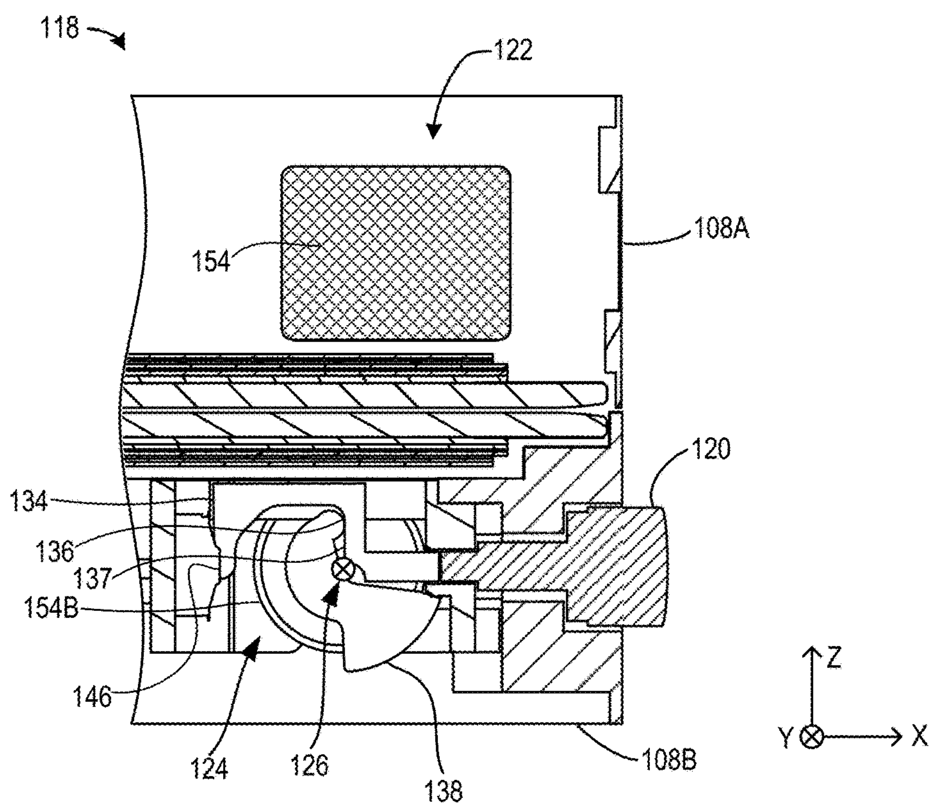
FIG. 4
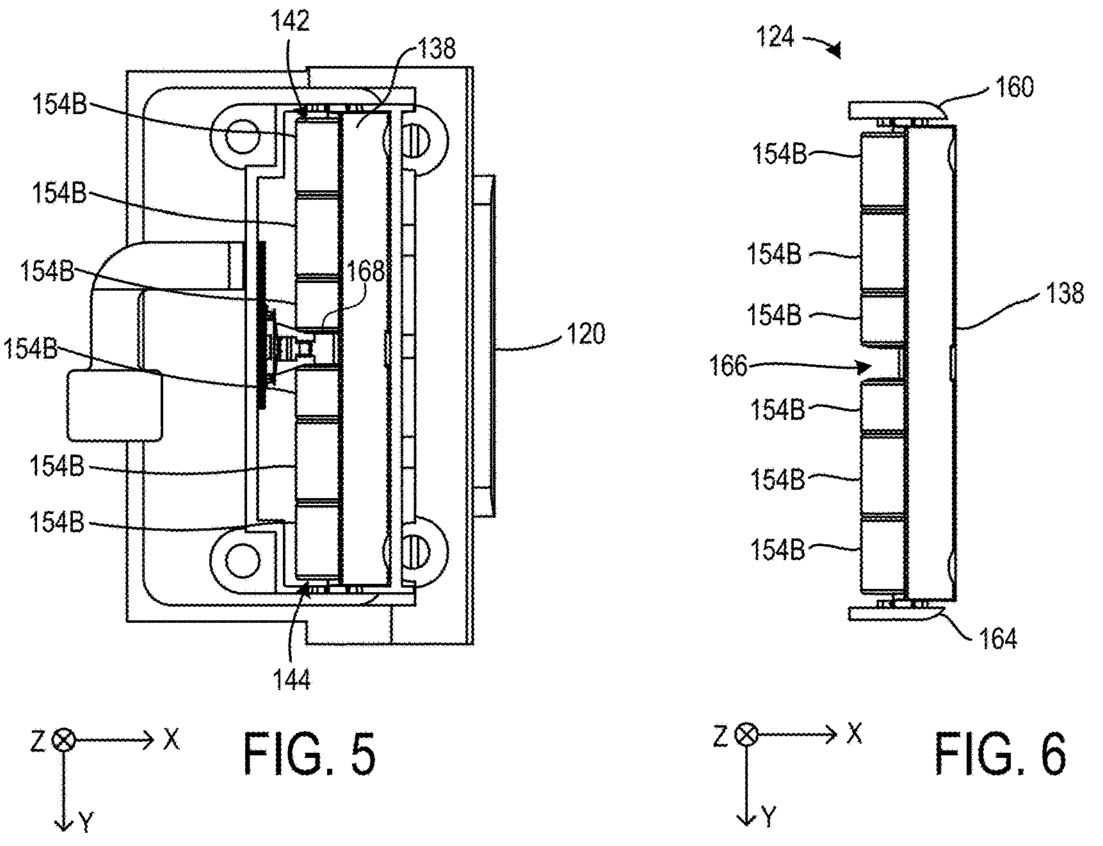
FIG. 5
FIG. 6

Halbach Array

Single Magnet

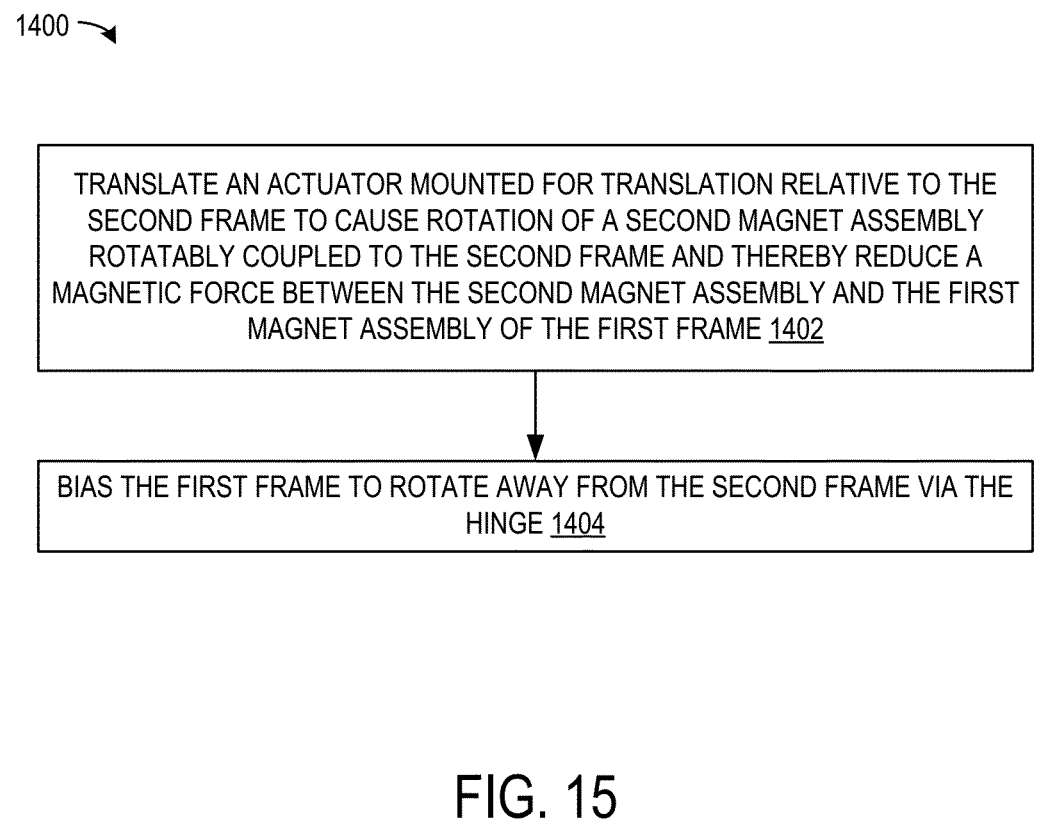

1400

TRANSLATE AN ACTUATOR MOUNTED FOR TRANSLATION RELATIVE TO THE SECOND FRAME TO CAUSE ROTATION OF A SECOND MAGNET ASSEMBLY ROTATABLY COUPLED TO THE SECOND FRAME AND THEREBY REDUCE A MAGNETIC FORCE BETWEEN THE SECOND MAGNET ASSEMBLY AND THE FIRST MAGNET ASSEMBLY OF THE FIRST FRAME 1402

BIAS THE FIRST FRAME TO ROTATE AWAY FROM THE SECOND FRAME VIA THE HINGE 1404

FIG. 15

ROTATING MAGNET ASSEMBLY IN A FOLDABLE DEVICE

CROSS REFERENCE TO RELATED APPLICATIONS

The present application is a U.S. National Phase of International Patent Application Serial No. PCT/US2023/062711 entitled "ROTATING MAGNET ASSEMBLY IN A FOLDABLE DEVICE", filed Feb. 16, 2023, which claims priority to Netherlands Patent Application Serial No. 2031418, filed Mar. 28, 2022, the entire contents of each of which are hereby incorporated by reference for all purposes.

BACKGROUND

In some devices, such as a dual-screen smartphone or laptop, two displays are rotatably coupled such that the displays are movable with respect to one another. An attachment apparatus may be used to secure the device in a closed orientation.

SUMMARY

According to one aspect of the present disclosure, a foldable computing device comprises a first frame that includes a first magnet assembly and a second frame rotatably coupled to the first frame via a hinge. The second frame comprises a second magnet assembly operatively configured for rotation with respect to the second frame. The second magnet assembly attracts the first magnet assembly of the first frame when the first frame and the second frame are in a closed configuration. The second frame further comprises an actuator operatively configured to rotate the second magnet assembly to thereby reduce a magnetic force between the first magnet assembly and the second magnet assembly and allow the first frame and the second frame to rotate away from the closed configuration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is another cross-sectional view taken along line 2-2 of FIG. 1D showing the actuator of the foldable computing device in a depressed position.

FIG. 5 shows a bottom-up view of the second magnet assembly and actuator with the foldable computing device in the depressed position of FIG. 4.

FIG. 6 shows a bottom-up view of the second magnet assembly of FIG. 5.

FIG. 15 shows a block diagram of an example method for opening a foldable computing device from a closed configuration according to examples of the present disclosure.

DETAILED DESCRIPTION

As introduced above, some devices include a first frame that is rotatably coupled to a second frame. For example, in a dual-screen smartphone or laptop, a first frame and a second frame may each house a touch screen display and may be rotatably coupled such that the two displays are movable with respect to one another. An attachment apparatus may secure the first frame and the second frame together in a closed orientation.

In some instances, the device may use a mechanical latch and/or magnets to secure the movable frames together in the closed orientation. However, mechanical latches can require large footprints to accommodate moving parts. Mechanical interfaces also are subject to fatigue over time. Additionally, magnets that are strong enough to hold the device closed can occupy a large amount of packaging space and can be difficult to disengage when a user wishes to open the device.

To address these issues, examples are disclosed that relate to a foldable computing device that includes a first frame and a second frame rotatably coupled to the first frame via a hinge. The first frame comprises a first magnet assembly and the second frame comprises a second magnet assembly. The second magnet assembly is operatively configured for rotation with respect to the second frame, and attracts the first magnet assembly of the first frame when the first frame and the second frame are in a closed configuration. The device also includes an actuator operatively configured to rotate the second magnet assembly to thereby reduce a magnetic force between the first magnet assembly and the second magnet assembly and allow the first frame and the second frame to rotate away from the closed configuration. Advantageously and as described in more detail below, the rotatable second magnet assembly has a small footprint within the device, and also allows users to easily open the foldable device.

FIGS. 1A-1D show one example of a foldable computing device 104 in the form of a dual screen mobile computing device. In other examples, the foldable computing device may take the form of a laptop computing device, tablet computing device, or any other suitable computing device.

It will also be appreciated that the methods and devices disclosed herein may also apply to any other suitable folding object, such as a folding keyboard or a folding case for a computing device.

In the example of FIGS. 1A-1D, the foldable computing device 104 includes a housing 108 having a first frame 108A and a second frame 108B rotatably coupled to the first frame via a hinge 112. The first frame 108A includes a display 114A and the second frame 108B includes a second display 114B. Suitably, the first and second display are touch screen displays.

Figures 1A, 1B, 1C, 1D:
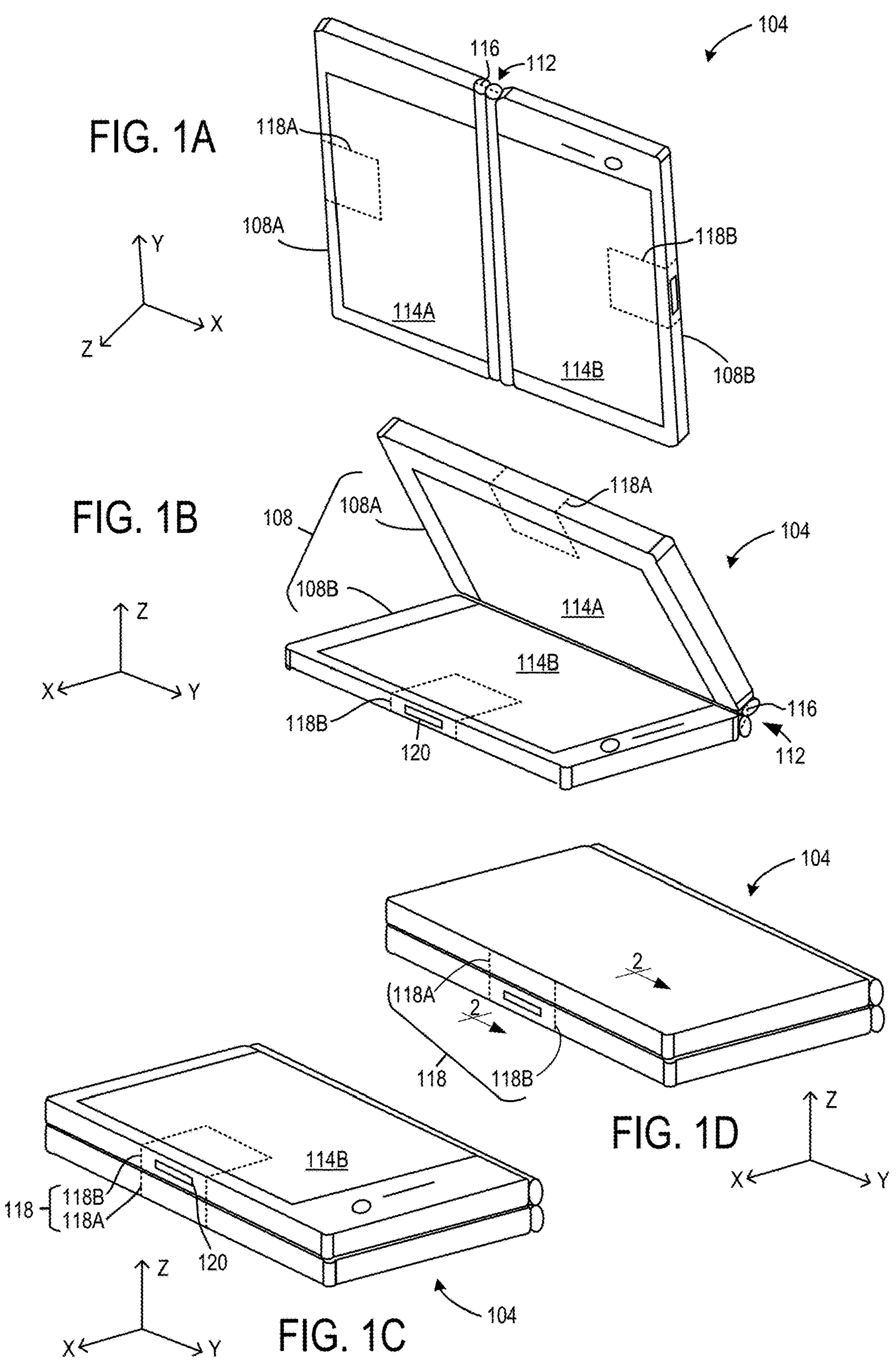
FIGS. 1A-1D show one example of a foldable computing device according to examples of the present disclosure.

In the example of FIGS. 1A-ID, the first frame 108A and the second frame 108B are movable relative to each other. More particularly, the hinge 112 is configured to permit the first frame 108A and the second frame 108B to rotate 360 degrees between angular orientations from a face-to-face orientation (FIG. 1D) to a back-to-back orientation (FIG. 1C). In other examples, the first frame 108A and the second frame 108B are rotatable relative to one another over a range less than 360 degrees.

With reference now to FIG. 1B, the hinge 112 permits the first frame 108A and the second frame 108B to rotate relative to one another such that an angle between the frames 108A, 108B can be decreased or increased by the user applying suitable force to the housing 108 of the mobile computing device 104. From the angular orientation shown in FIG. 1B, the first frame 108A and the second frame 108B may be rotated until the displays 114A, 114B reach a back-to-back angular orientation as shown in FIG. 1C or a face-to-face orientation (also referred to as a closed configuration) as shown in FIG. 1D.

In some examples, the foldable computing device 104 further comprises a spring 116 that is operatively configured to bias the first frame 108A and the second frame 108B away from the closed configuration of FIG. 1C towards an open configuration. In the example of FIGS. 1A-ID, the spring 116 is located at the hinge 112. In this example, the spring 116 comprises a torsion spring that is operatively configured to apply a torque to the first frame 108A and the second frame 108B about the hinge 112 when the device 104 is in the face-to-face orientation of FIG. 1D, with the torque biasing the first frame 108A and the second frame 108B towards the angular orientation shown in FIG. 1B. In this manner, the spring is operatively configured to open the foldable computing device.

The foldable computing device 104 further comprises an apparatus 118 operatively configured to secure the first frame 108A and the second frame 108B in the closed configuration shown in FIG. 1D. By closing the device in the face-to-face orientation of FIG. 1D, the displays 114A, 114B are protected by the housing 108 while the device is not in use (e.g., while the device is stowed in a user's pocket or backpack). The apparatus 118 also prevents the first frame and the second frame from moving freely when the device is not in use.

Additionally, in one potential advantage of the present disclosure and as described further below, the apparatus 118 is operatively configured to allow users to easily open the foldable computing device from the closed configuration of FIG. 1D. As described in more detail below, the apparatus 118 comprises an actuator 120, a first portion 118A located at the first frame 108A, and a second portion 118B located at the second frame 108B. The actuator 120 is operatively configured to disengage the first portion 118A and the second portion 118B of the apparatus 118 to allow the foldable computing device to open from the closed configuration. Additional aspects of the actuator 120 and the apparatus 118 are described in more detail below.

Figure 2:
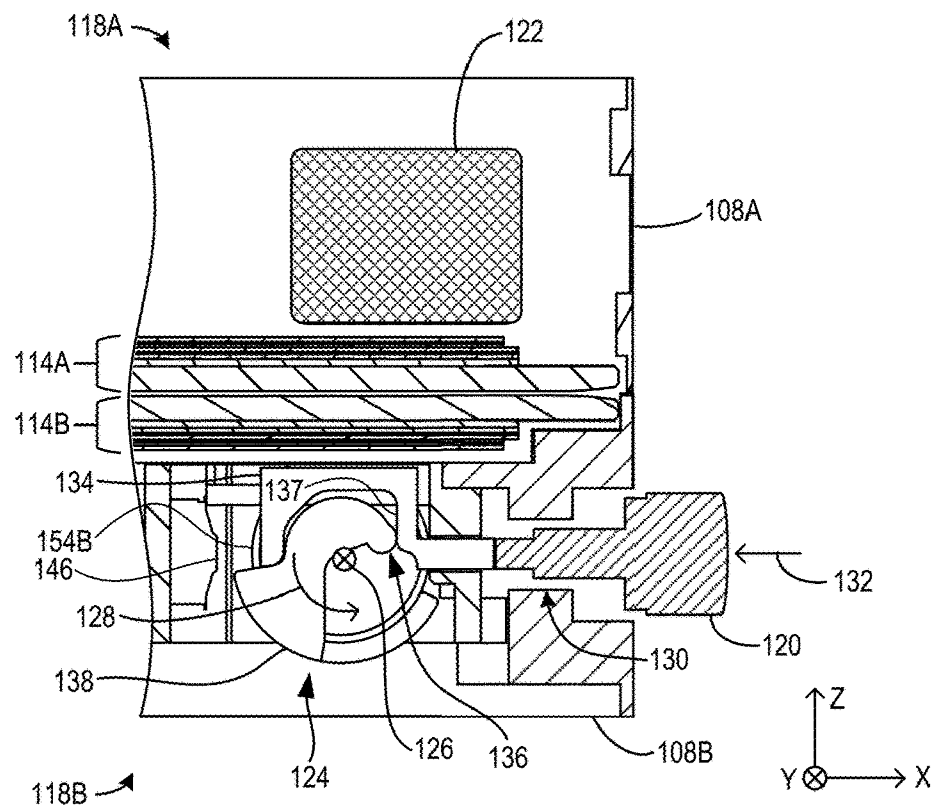
FIG. 2 is a partial cross-sectional view taken along line 2-2 of FIG. 1D showing a portion of the foldable computing device of FIGS. 1A-1D.

FIG. 2 shows a partial cross-sectional view of one example of the apparatus 118 of FIGS. 1A-1D taken along line 2-2 of FIG. 1D. As shown in FIG. 2, the first portion 118A of the apparatus 118, located at the first frame 108A of the foldable computing device 104, comprises a first magnet assembly 122. The second portion 118B of the apparatus 118, located at the second frame 108B, comprises a second magnet assembly 124. The second magnet assembly 124 is operatively configured to attract the first magnet assembly 122 of the first frame 108A when the first frame 108A and the second frame 108B are in the closed configuration of FIG. 1D. In this manner, the first magnet assembly 122 and the second magnet assembly 124 are operatively configured to secure the first frame 108A and the second frame 108B together when the foldable computing device 104 is in the closed configuration.

Figure 3:
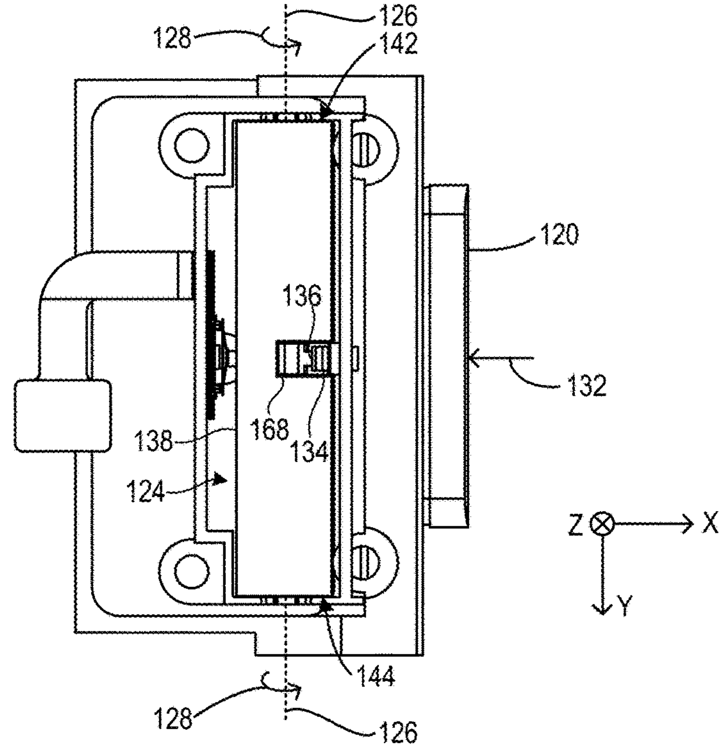
FIG. 3 shows a bottom-up view of a second magnet assembly and actuator of the foldable computing device shown in FIG. 2.

With continued reference to FIG. 2 and in one potential advantage of this configuration, the second magnet assembly 124 is operatively configured for rotation with respect to the second frame 108B. For example, as depicted in FIGS. 2 and 3, the second magnet assembly 124 comprises a cylindrical magnet housing 138 rotatably coupled to the second frame 108B. In different examples the magnet housing 138 contains at least one magnet 154B. In some examples, the magnet housing 138 comprises a plurality of magnets 154B. In the present example, and as described in more detail below with respect to FIG. 6, the magnet housing 138 contains six magnets 154B arranged along the length of the cylindrical magnet housing 138. In other examples, any suitable number of magnets 154B may be utilized. In some examples, the magnet housing 138 contains a single magnet 154B. As described in more detail below with reference to FIGS. 12-14, a plurality of magnets can be arranged into an array (e.g., a Halbach array) that provides a strong attractive force between the first magnet assembly and the second magnet assembly, and which provides the actuator with desirable force-stroke behavior.

In the example of FIG. 2, the second magnet assembly 124 is rotatable around an axis of rotation 126 parallel to the Y-axis. FIG. 3 shows a bottom-up view of the second magnet assembly 124 of FIG. 2 including the axis of rotation 126. As described further below, translation of the actuator 120 in the negative x-axis direction causes rotation of the second magnet assembly 124 in a counter-clockwise direction as indicated at 128. This rotation of the second magnet assembly 124 causes corresponding rotation of its magnetic flux distribution in a manner that reduces the magnetic attraction between the first magnet assembly 122 and the second magnet assembly 124. Advantageously, this allows the first frame 108A and the second frame 108B to rotate away from the closed configuration and the foldable computing device 104 to open, for example by allowing the spring 116 to overcome the magnetic attraction between the first magnet assembly and the second magnet assembly, and rotate the first frame and second frame away from one another.

In some examples, the actuator 120 is mounted for translation relative to the second frame 108B. In the example of FIG. 2, the actuator 120 is mounted within a channel 130 that permits translation of the actuator 120 parallel to the X-axis. FIGS. 2-3 depict the actuator 120 in an extended position, in which the actuator 120 protrudes from the second frame 108B in the positive X-axis direction. The portion of the actuator 120 that protrudes from the second frame 108B in the X-axis direction in this extended position enables users to press the actuator in the negative X-axis direction, as indicated at 132, to reduce the force of attraction between the magnets (disengage the magnets).

FIGS. 4-5 depict the actuator 120 in a depressed position in which the actuator 120 has been translated in the negative X-axis direction into the second frame 108B. This translation of the actuator 120 causes the counter-clockwise rotation 128 of the second magnet assembly 124 and magnet housing 138 (see FIG. 2) to the position shown in FIGS. 4 and 5. FIG. 6 shows a bottom-up view of the second magnet assembly 124 and cylindrical magnet housing 138 rotated to the position of FIG. 5. In this example the magnet housing 138 is rotatably coupled to mounting portions 160, 164 of the second frame 108B of the foldable computing device 104. In some examples, the second magnet assembly 124 has a diameter in the range of 3.0-3.5 mm and a length dimension (parallel to the Y-axis) of approximately 14 mm.

As noted above, in this example the magnet housing 138 contains six magnets 154B. A first group of three magnets 154B extends from adjacent the mounting portion 160 along the length of the magnet housing 138. A second group of three magnets 154B extends from adjacent the opposite mounting portion 164 along the length of the magnet housing 138. The two innermost magnets 154B in each group of magnets form a gap 166 that aligns with a cutout portion 168 of the cylindrical magnet housing 138 (see FIGS. 3 and 5). Advantageously and as described further below, this configuration creates space to accommodate a pusher arm 134 of the actuator 120. Additionally, and as described in more detail below, in some examples the group of magnets 154B is arranged in a Halbach array.

With reference to FIGS. 2 and 4, in this configuration translation of the actuator 120 in the negative X-axis direction pushes the pusher arm 134 of the actuator toward the magnet housing 138. The pusher arm 134 is operatively configured to apply a force at a contact portion 136 of the housing 138 of the second magnet assembly 124. More particularly and with reference again to FIG. 2, the pusher arm 134 comprises a cutout portion 137 that functions as a camming surface that contacts the contact portion 136 of the housing 138 as the pusher arm is translated. As depicted in FIG. 2, the application of force on the contact portion 136 in the negative X-axis direction causes counterclockwise rotation 128 of the second magnet assembly 124 about the axis of rotation 126 to a rotated orientation depicted in FIG. 4. In this manner, input provided at the actuator is configured to rotate the second magnet assembly.

In different use case examples, the actuator 120, pusher arm 134 and housing 138 can be sized to accommodate different translation distances of the actuator that cause desired amounts of rotation of the magnet housing 138 and second magnet assembly 124. In some examples, translation 132 of the actuator 120 of approximately 1 mm causes rotation 128 of approximately 80 degrees of the magnet housing 138 and second magnet assembly 124. In some examples, translation 132 in the range of 0.3-0.5 mm corresponds to rotation 128 in the range of 40-50 degrees. In other examples, the distance of translation 132 may be correlated to any other suitable rotational amount. In this manner, these components can be designed to cause the actuator to provide a suitable amount of magnet rotation. This magnet rotation presents a pleasing user experience when opening the foldable device.

As depicted in FIGS. 2 and 4, the actuator 120 is operatively configured to engage the second magnet assembly 124 (via the pusher arm 134) at a location that is offset from the axis of rotation 126 of the second magnet assembly. For example and with reference to FIG. 2, the contact portion 136 of the housing 138 is displaced from the axis 126 in the positive Z-axis direction and the positive X-axis direction prior to translation 132 of the actuator 120. In some examples, the contact portion 136 is located 1.0 mm in the positive X-axis direction and 0.2 mm in the positive Z-axis direction from the axis 126 in the orientation depicted in FIG. 2. Accordingly, and in another potential advantage of the present disclosure, by displacing the contact portion 136 of the housing 138 from the axis of rotation 126 of the housing, a lever is created that provides a mechanical advantage that assists a user to more easily press the actuator 120 and rotate the second magnet assembly 124.

With reference to FIG. 4, as the actuator 120 is pressed the contact portion 136 and second magnet assembly 124 rotate about the axis 126. In the present example and as shown in FIG. 4, when the actuator 120 is fully depressed the contact portion 136 is displaced from the axis 126 in the positive Z-axis direction by a distance greater than its displacement in the non-depressed orientation of FIG. 2. In some examples, at this orientation the contact portion 136 is located 1.0 mm in the positive Z-axis direction and 0.2 mm in the negative X-axis direction from the axis 126. In this manner, and in another potential advantage of the present disclosure, the increase in Z-axis displacement of the contact portion 136 from the non-depressed position of FIG. 2 to the fully depressed position of FIG. 4 provides corresponding increasing leverage as the actuator is depressed. This results in a desirable force-stroke behavior of the actuator 120. Additional aspects of the actuator force profile are described in more detail below with reference to FIGS. 12-13.

In the example depicted in FIGS. 2-5, the pusher arm 134 extends into the cutout portion 168 of the magnet housing 138 of the second magnet assembly 124, and the actuator 120 is centered on the second magnet assembly 124 in the Y-axis direction. In other examples, the actuator 120 can be configured to interact with the second magnet assembly 124 at any other suitable location. For example, the pusher arm 134 may be located at either distal end 142, 144 of the second magnet assembly 124, enabling the actuator 120 and/or the second magnet assembly 124 to be placed at corresponding locations within the foldable computing device.

In some examples, the second magnet assembly 124 has rotational symmetry about the axis of rotation 126 of the second magnet assembly. In the example depicted in FIGS. 2-6, the second magnet assembly 124 is substantially cylindrical with rotational symmetry about the axis 126. Advantageously, the rotational symmetry of the second magnet assembly 124 allows the second magnet assembly to rotate about the axis of rotation 126 without expanding its footprint in the X-axis and Z-axis directions. This allows the second magnet assembly 124 to operate within a narrower space than a magnet assembly that lacks rotational symmetry. Similarly, utilizing rotation to reduce the magnetic force between the second magnet assembly and the first magnet assembly allows the second magnet assembly 124 to operate within a smaller volume of space than other configurations that utilize translation to disengage the magnets.

Figure 7:
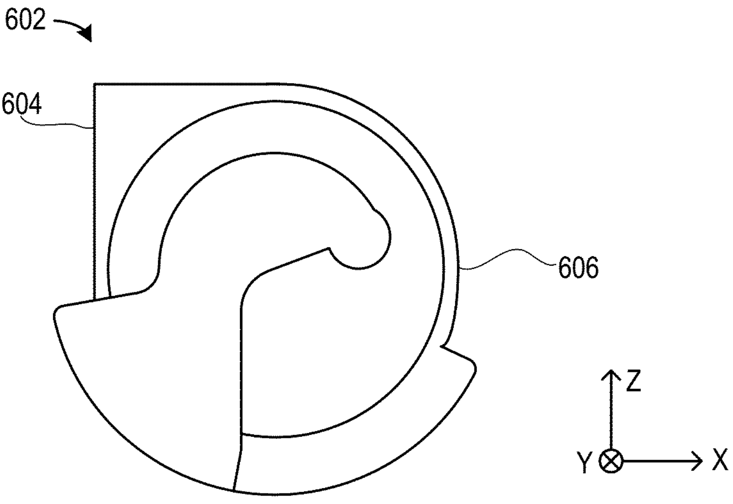
FIG. 7 shows another example of a second magnet assembly that can be used in the foldable computing device of FIGS. 1A-1D.

In other examples, at least a portion of the second magnet assembly 124 is asymmetrical. FIG. 7 shows an example of an asymmetrical second magnet assembly 602 for a foldable computing device according to aspects of the present disclosure. The asymmetrical second magnet assembly 602 includes a corner 604 that protrudes from an otherwise cylindrical circumference 606 of the second magnet assembly 602. The corner 604 enlarges the second magnet assembly 602 and increases the corresponding magnetic field relative to the cylindrical magnet assembly 124 of FIGS. 2-5. In this manner, and in one potential advantage of this configuration, when the second magnet assembly 602 is in the non-depressed orientation shown in FIG. 2, it generates a stronger attractive force with respect to the first magnet assembly 122. Additionally, as the asymmetrical second magnet assembly 602 is rotated to the depressed orientation of FIG. 4, the additional mass of the corner 604 is translated away from the first magnet assembly, resulting in a faster drop off in the attractive force and corresponding less force required by the user in pressing the actuator 120. In this manner, the shape of the magnet assembly can be used to tune a force-response profile of the apparatus.

Figure 8:
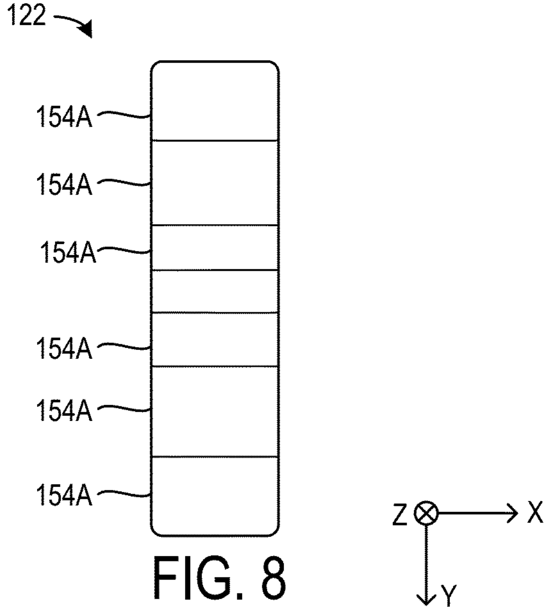
FIG. 8 shows a bottom-up view of the first magnet assembly of FIGS. 4 and 5.

With reference again to FIGS. 2-5, in some examples the first magnet assembly 122 is affixed at a stationary position within the first frame 108A. Affixing the first magnet assembly at a stationary position enables the use of a larger magnet, which can provide a greater attractive force, than a moving magnet assembly. In other examples, the first magnet assembly 122 is configured for movement with respect to the first frame 108A. In the present example and with reference also to FIG. 8, the first magnet assembly 122 comprises a rectangular configuration of a plurality of magnets 154A. In this example and like the second magnet assembly 124, the first magnet assembly 122 comprises six magnets. In other examples, the first magnet assembly 122 utilizes a single magnet or other quantity of magnets, such as five. In some examples, the first magnet assembly 122 comprises any other suitable shape, such as a cylinder. In some examples, the first magnet assembly 122 has a Y-axis length that substantially matches the Y-axis length of magnets 154B of the second magnet assembly 124. In one example, the first magnet assembly 122 has a Z-axis height of 3.5 mm, an X-axis width of 4 mm, and a Y-axis length of 14 mm.

With reference again to FIGS. 1D and 2, when the device is in the closed configuration, the first magnet assembly 122 and the second magnet assembly 124 are separated by the display 114A and the second display 114B. In other examples, the first magnet assembly 122 may contact the second magnet assembly 124 in the closed configuration (e.g., via openings in the display 114A and the second display 114B). In these examples, the device may enable the use of smaller magnets and smaller motions to disengage the magnets relative to the use of magnets separated by other components of the device, such as the touch screen displays.

Figure 9:
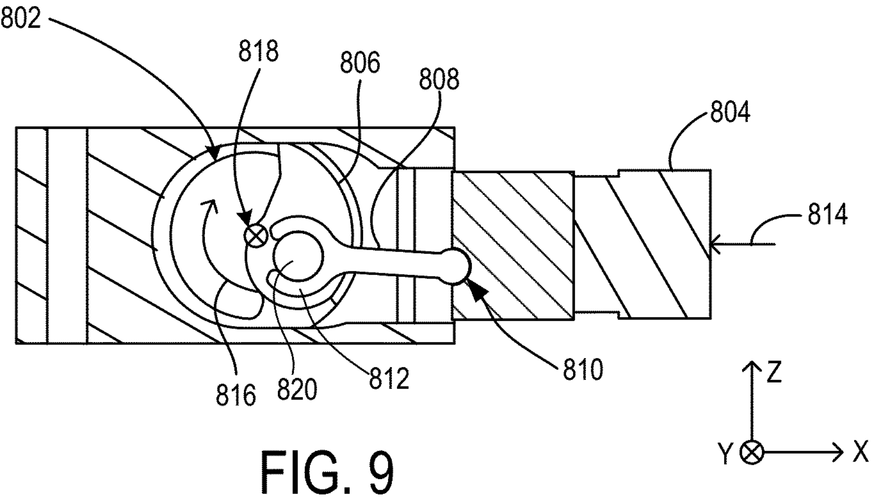
FIG. 9 shows another example of an actuator coupled to the second magnet assembly via a linkage that can be used in the foldable computing device of FIGS. 1A-1D.
Figure 10:
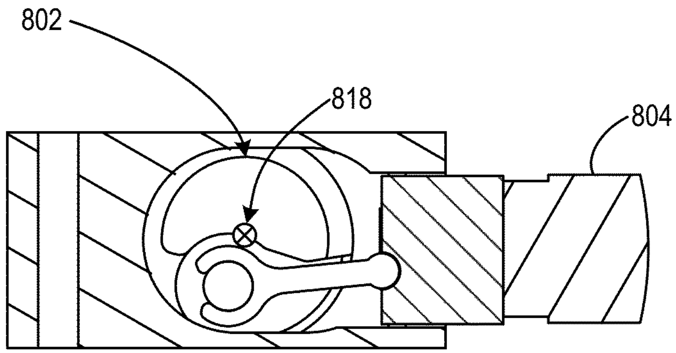
FIG. 10 shows the actuator and linkage of FIG. 9 in the depressed position.
Figure 10:
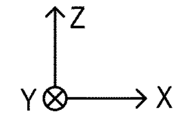

As described above in the example of FIGS. 2-5, the actuator 120 is configured to rotate the second magnet assembly 124 by applying a force to the second magnet assembly via the pusher arm 134. In other examples, the actuator is coupled to the second magnet assembly via a linkage. FIGS. 9 and 10 show another example of a second magnet assembly 802 that can be used in a foldable computing device (e.g., the foldable computing device 104 of FIGS. 1A-1D). An actuator 804 is coupled to a housing 806 of the second magnet assembly 802 via a connector arm 808. The connector arm 808 is coupled to the actuator 804 via a first pivot 810 located at a distal end of the connector arm 808. A capture element 812 located at an opposite end of the connector arm 808 from the first pivot 810 moveably couples the connector arm 808 to the housing 806 of the second magnet assembly 802 via a pin 820. In this manner, and as shown in FIGS. 9 and 10, translation 814 of the actuator 804 causes clockwise rotation 816 of the second magnet assembly 802 about an axis of rotation 818 that is parallel to the Y-axis. With this configuration, and in one potential advantage of this example, by directly linking the actuator 804 to the housing 806 in this manner, this configuration can operate in and occupy a small footprint in the Z-axis direction. Additionally, this configuration and other examples utilizing a coupling link can provide an engagement embodying reduced friction as compared to other configurations.

With reference again to FIGS. 2 and 4, in some examples the computing device 104 comprises a power button 146 located adjacent to the second magnet assembly 124. In these examples and as shown in FIG. 4, the pusher arm 134 of the actuator 120 is further configured to contact and depress the power button when the actuator has rotated the magnet housing 138. The power button is configured to control a power state of the foldable computing device 104. Accordingly, and in one potential advantage of the present disclosure, the same user operation (e.g., translation 132 of the actuator 120) is operatively configured to open the foldable computing device and power on or wake the device.

Figure 11:
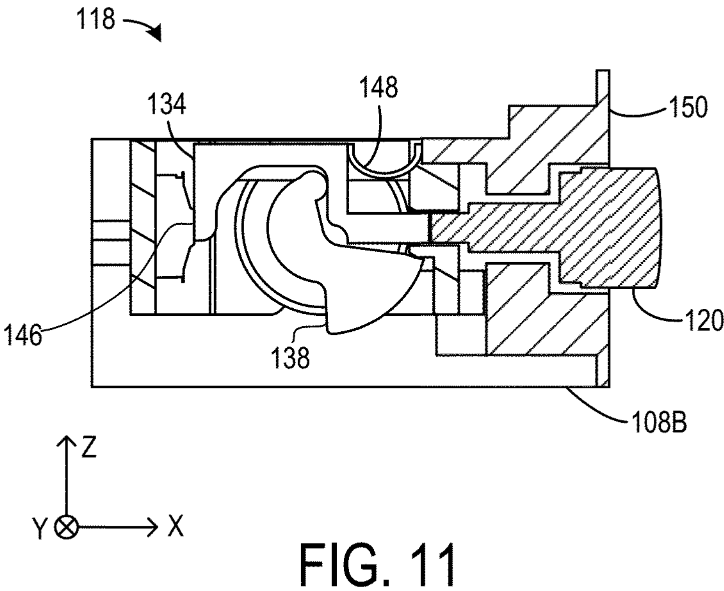
FIG. 11 shows another example of a portion of the foldable computing device of FIGS. 1A-1D according to examples of the present disclosure.

In some examples, and with reference now to FIG. 11, the apparatus 118 optionally includes one or more biasing elements that bias and maintain the pusher arm 134 in the depressed position after the actuator 120 is depressed and the foldable computing device 104 is opened. In the example of FIG. 11, a spring 148 (e.g., a leaf spring) biases the pusher arm 134 in the negative X-axis direction against a housing portion 150 of the second frame 108B to maintain the pusher arm 134 in the depressed position after the actuator 120 is depressed. In some examples, the spring force maintains contact between the pusher arm 134 and the power button 146 without depressing the button. In another potential advantage of the present disclosure, the spring 148 is operatively configured to prevent the pusher arm 134 from moving freely when the foldable computing device 104 is open. Additionally, when the first frame 108A and the second frame 108B are subsequently folded to the closed orientation of FIG. 2, the magnetic attraction between the first magnet assembly 122 and the second magnet assembly 124 overcomes the biasing force of spring 148 and causes the magnet housing 138 of the second magnet assembly to rotate in the clockwise direction and correspondingly translate the actuator 120 in the positive X-axis direction to increase its protrusion from the second frame 108B.

Figure 12:
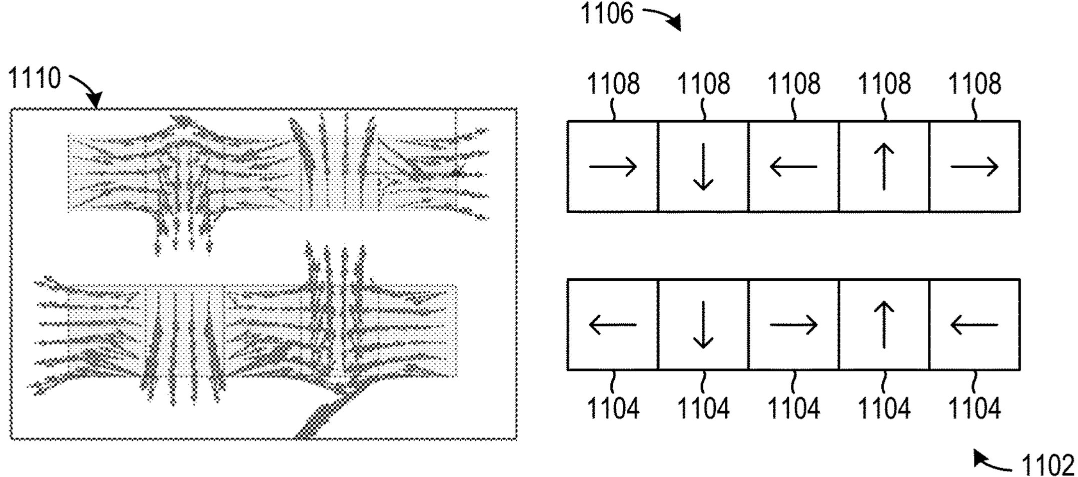
FIG. 12 shows a schematic diagram of an example of a first magnet assembly and a second magnet assembly that can be used in the foldable computing device of FIGS. 1A-1D.

As introduced above, in some examples, the first magnet assembly 122 and/or the second magnet assembly 124 comprise a plurality of magnets. In some examples, the first magnet assembly 122 and/or the second magnet assembly 124 comprise a plurality of magnets arranged in a Halbach array. For example, FIG. 12 shows a schematic diagram of a first magnet assembly 1102 comprising a plurality of magnets 1104 and a second magnet assembly 1106 comprising a plurality of magnets 1108 that are each arranged in a Halbach array. Each magnet 1104, 1108 is annotated with a directional arrow in FIG. 12 indicating a general orientation of each magnet's magnetic field. FIG. 12 also includes a vector field diagram 1110 schematically illustrating the magnetic fields of the first magnet assembly 1102 and the second magnet assembly 1106. Accordingly, and in one potential advantage of the present disclosure, the magnetic fields of one Halbach array are configured to augment the magnetic fields of the other array to generate a stronger attractive force between the first magnet assembly 1102 and the second magnet assembly 1106 when the first frame 108A and the second frame 108B are in the closed orientation.

Figure 13:
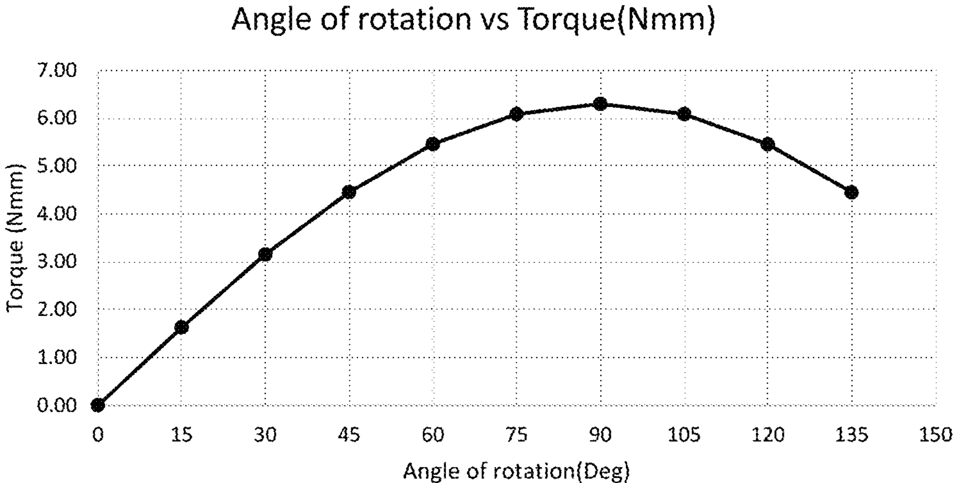
FIG. 13 shows a plot of torque as a function of a rotation angle of an example second magnet assembly comprising a Halbach array according to examples of the present disclosure.
Figure 14:
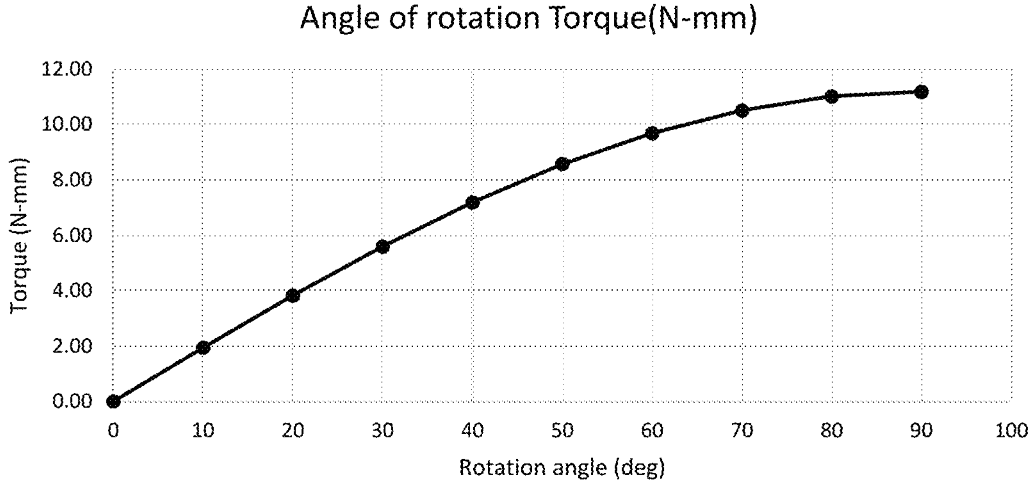
FIG. 14 shows a plot of torque as a function of rotation angle of another example second magnet assembly.

Additionally, and in another potential advantage of this configuration, utilizing a Halbach array significantly decreases the required user force to actuate the actuator 120 and rotate the second magnet assembly 1106 to release the first frame 108A and the second frame 108B from the closed orientation, as compared to configurations utilizing magnets having parallel magnetic field orientations. FIGS. 13 and 14 show plots of torque at the second magnet assembly over ranges of angles of rotation, with zero degrees corresponding to the closed configuration. In the example of FIG. 13, the second magnet assembly comprises a plurality of magnets arranged in a Halbach array. In the example of FIG. 14, the second magnet assembly comprises a single magnet.

As depicted in FIGS. 13-14, in this example the Halbach array configuration of FIG. 13 demands a smaller magnitude of force to rotate the second magnet assembly as compared to the single magnet configuration of FIG. 14, thereby providing a more desirable user experience. For example, in the example of FIG. 13 the amount of torque applied to rotate the second magnet assembly 90 degrees is 6 Newton-millimeters (Nmm), as compared to over 11 Nmm required for the single magnet of FIG. 14 to rotate the second magnet assembly by a similar amount. Accordingly, and in one potential advantage of the present disclosure, a configuration utilizing one or more Halbach arrays as described above enables the user to apply sufficient torque to rotate the second magnet assembly through single-hand operation of the actuator without requiring additional assisting mechanisms, such as springs.

With reference now to FIG. 15, a flow diagram is provided depicting an example method 1400 for opening a foldable computing device from a closed configuration. The following description of method 1400 is provided with reference to the components described herein and shown in FIGS. 1-14. The method 1400 is performed at a foldable computing device comprising a first frame comprising a first magnet assembly and a second frame rotatably coupled to the first frame via a hinge. In some examples, the method 1400 is performed at the foldable computing device 104 of FIGS. 1A-1D. In other examples, the method 1400 is performed in other contexts using other suitable components.

At 1402, the method 1400 includes translating an actuator mounted for translation relative to the second frame to cause rotation of a second magnet assembly rotatably coupled to the second frame and thereby reduce a magnetic force between the second magnet assembly and the first magnet assembly of the first frame. For example, the actuator 120 of FIG. 2 is operatively configured for translation in the negative X-axis direction into the second frame 108B, as indicated at 132. As depicted in the examples of FIGS. 2-5, translation 132 of the actuator 120 causes rotation 128 of the second magnet assembly 124, reducing a magnetic force between the second magnet assembly 124 and the first magnet assembly 122.

At 1404, the method 1400 includes biasing the first frame to rotate away from the second frame via the hinge. For example, the spring 116 of FIGS. 1A-1D is operatively configured to bias the first frame 108A and the second frame 108B away from the closed configuration. In this manner, the spring is operatively configured to open the foldable computing device in response to the rotation of the second magnet assembly reducing the magnetic attraction between the frames.

The following paragraphs provide additional support for the claims of the subject application. One aspect provides a foldable computing device, comprising: a first frame comprising a first magnet assembly; and a second frame rotatably coupled to the first frame via a hinge, the second frame comprising, a second magnet assembly operatively configured for rotation with respect to the second frame, the second magnet assembly attracting the first magnet assembly of the first frame when the first frame and the second frame are in a closed configuration, and an actuator operatively configured to rotate the second magnet assembly to thereby reduce a magnetic force between the first magnet assembly and the second magnet assembly and allow the first frame and the second frame to rotate away from the closed configuration. The foldable computing device may additionally or alternative include, wherein the actuator is mounted for translation relative to the second frame, and wherein translation of the actuator causes rotation of the second magnet assembly. The foldable computing device may additionally or alternative include, wherein the second magnet assembly comprises a magnet housing containing at least one magnet, the magnet housing rotatably coupled to the second frame. The foldable computing device may additionally or alternative include, wherein one or other or both of the first magnet assembly and the second magnet assembly comprise a plurality of magnets arranged in a Halbach array. The foldable computing device may additionally or alternative include, wherein the first magnet assembly is affixed at a stationary position within the first frame. The foldable computing device may additionally or alternative include, wherein the first magnet assembly comprises a magnet housing containing a plurality of magnets. The foldable computing device may additionally or alternative include, wherein the actuator is operatively configured to engage the second magnet assembly at a location that is offset from an axis of rotation of the second magnet assembly. The foldable computing device may additionally or alternative include, wherein the second magnet assembly has rotational symmetry about an axis of rotation of the second magnet assembly. The foldable computing device may additionally or alternative include, wherein at least a portion of the second magnet assembly is asymmetrical. The foldable computing device may additionally or alternative include, wherein the actuator is coupled to the second magnet assembly via a linkage. The foldable computing device may additionally or alternative include a spring operatively configured to bias the first frame and the second frame away from the closed configuration. The foldable computing device may additionally or alternative include a power button located adjacent to the second magnet assembly, wherein the actuator is further configured to depress the power button.

Another aspect provides an apparatus for allowing a foldable computing device to open from a closed configuration, the foldable computing device comprising a first frame comprising a first magnet assembly and a second frame rotatably coupled to the first frame via a hinge, the apparatus comprising: a second magnet assembly rotatably coupled to the second frame, the second magnet assembly operatively configured to attract the first magnet assembly of the first frame when the first frame and the second frame are in the closed configuration; and an actuator mounted for translation relative to the second frame, wherein translation of the actuator causes rotation of the second magnet assembly to thereby reduce a magnetic force between the first magnet assembly and the second magnet assembly and allow the first frame and the second frame to rotate away from the closed configuration. The apparatus may additionally or alternatively include, wherein the actuator is operatively configured to engage the second magnet assembly at a location that is offset from an axis of rotation of the second magnet assembly. The apparatus may additionally or alternatively include, wherein the actuator is coupled to the second magnet assembly via a linkage. The apparatus may additionally or alternatively include a spring operatively configured to bias the first frame and the second frame away from the closed configuration. The apparatus may additionally or alternatively include, wherein the second magnet assembly comprises a magnet housing containing at least one magnet, the magnet housing rotatably coupled to the second frame. The apparatus may additionally or alternatively include, wherein the first magnet assembly and/or the second magnet assembly comprise a plurality of magnets arranged in a Halbach array. The apparatus may additionally or alternatively include, wherein the second magnet assembly has rotational symmetry about an axis of rotation of the second magnet assembly.

Another aspect provides a method for opening a foldable computing device from a closed configuration, the foldable computing device comprising a first frame comprising a first magnet assembly and a second frame rotatably coupled to the first frame via a hinge, the method comprising: translating an actuator mounted for translation relative to the second frame to cause rotation of a second magnet assembly rotatably coupled to the second frame and thereby reduce a magnetic force between the second magnet assembly and the first magnet assembly of the first frame; and biasing the first frame to rotate away from the second frame via the hinge.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A foldable computing device, comprising:

a first frame comprising a first magnet assembly;

a second frame rotatably coupled to the first frame via a hinge; and a spring located at the hinge and operatively configured to bias the first frame and the second frame away from a closed configuration;

wherein the second frame comprises, a second magnet assembly operatively configured for rotation with respect to the second frame, the second magnet assembly attracting the first magnet assembly of the first frame when the first frame and the second frame are in the closed configuration, and an actuator operatively configured to rotate the second magnet assembly to thereby reduce a magnetic force between the first magnet assembly and the second magnet assembly such that the spring overcomes the magnetic attraction between the first magnet assembly and the second magnet assembly and the first frame and the second frame rotate away from the closed configuration.

2. The foldable computing device of claim 1, wherein the actuator is mounted for translation relative to the second frame, and wherein translation of the actuator causes rotation of the second magnet assembly.

3. The foldable computing device of claim 1, wherein the second magnet assembly comprises a magnet housing containing at least one magnet, the magnet housing rotatably coupled to the second frame.

4. The foldable computing device of claim 1, wherein the first magnet assembly and/or the second magnet assembly comprise a plurality of magnets arranged in a Halbach array.

5. The foldable computing device of claim 1, wherein the first magnet assembly is affixed at a stationary position within the first frame.

6. The foldable computing device of claim 1, wherein the first magnet assembly comprises a magnet housing containing a plurality of magnets.

7. The foldable computing device of claim 1, wherein the actuator is operatively configured to engage the second magnet assembly at a location that is offset from an axis of rotation of the second magnet assembly.

8. The foldable computing device of claim 1, wherein the second magnet assembly has rotational symmetry about an axis of rotation of the second magnet assembly.

9. The foldable computing device of claim 1, wherein at least a portion of the second magnet assembly is asymmetrical.

10. The foldable computing device of claim 1, wherein the actuator is coupled to the second magnet assembly via a linkage.

11. The foldable computing device of claim 1, further comprising a power button located adjacent to the second magnet assembly, wherein the actuator is further configured to depress the power button.

12. An apparatus for allowing a foldable computing device to open from a closed configuration, the foldable computing device comprising a first frame comprising a first magnet assembly and a second frame rotatably coupled to the first frame via a hinge, the apparatus comprising:

a spring located at the hinge and operatively configured to bias the first frame and the second frame away from the closed configuration;

a second magnet assembly rotatably coupled to the second frame, the second magnet assembly operatively configured to attract the first magnet assembly of the first frame when the first frame and the second frame are in the closed configuration; and an actuator mounted for translation relative to the second frame, wherein translation of the actuator causes rotation of the second magnet assembly to thereby reduce a magnetic force between the first magnet assembly and the second magnet assembly such that the spring overcomes the magnetic attraction between the first magnet assembly and the second magnet assembly and the first frame and the second frame rotate away from the closed configuration.

13. The apparatus of claim 12, wherein the actuator is operatively configured to engage the second magnet assembly at a location that is offset from an axis of rotation of the second magnet assembly.

14. The apparatus of claim 12, wherein the actuator is coupled to the second magnet assembly via a linkage.

15. The apparatus of claim 12, wherein the second magnet assembly comprises a magnet housing containing at least one magnet, the magnet housing rotatably coupled to the second frame.

16. The apparatus of claim 12, wherein the first magnet assembly and/or the second magnet assembly comprise a plurality of magnets arranged in a Halbach array.

17. The apparatus of claim 12, wherein the second magnet assembly has rotational symmetry about an axis of rotation of the second magnet assembly.

18. A method for opening a foldable computing device from a closed configuration, the foldable computing device comprising a first frame comprising a first magnet assembly, a second frame rotatably coupled to the first frame via a hinge, and a spring located at the hinge and operatively configured to bias the first frame and the second frame away from the closed configuration, the method comprising:

translating an actuator mounted for translation relative to the second frame to cause rotation of a second magnet assembly rotatably coupled to the second frame and thereby reduce a magnetic force between the second magnet assembly and the first magnet assembly of the first frame; and biasing the first frame to rotate away from the second frame via the hinge.

19. The method of claim 18, wherein the first magnet assembly and/or the second magnet assembly comprise a plurality of magnets arranged in a Halbach array.

20. The method of claim 18, wherein the foldable computing device further comprises a power button located adjacent to the second magnet assembly, and translating the actuator also causes the actuator to depress the power button.

* * * * *